Patented Oct. 17, 1922.

1,432,110

UNITED STATES PATENT OFFICE.

SEM LERNER, OF PERU, MASSACHUSETTS.

OIL FOR USE IN PAINTING AND VARNISHING.

No Drawing. Application filed October 2, 1920. Serial No. 414,271.

*To all whom it may concern:*

Be it known that I, SEM LERNER, a citizen of the United States, residing at Peru, in the county of Berkshire and State of Massachusetts, have invented certain new and useful Improvements in Oils for Use in Painting and Varnishing, of which the following is a specification.

The object of my invention is to provide a composition of matter which may be used as a substitute for linseed oil in the manufacture of paints, and which, when so used, will render the finished paint equal in every respect to a pure linseed oil product.

A further object of my invention is to provide a composition of matter which may be used as a varnish without the addition of any other ingredients, and serve as an effective covering for all kinds of wood, stone, and metal.

The composition which I employ consists of rosin, turpentine, petroleum ether, rosin spirit, coal tar naphtha, and benzine. They are mixed together in approximately the following proportions:

| | |
|---|---|
| Rosin | 4 pounds. |
| Turpentine | 1 pint. |
| Petroleum ether | 1 pint. |
| Rosin spirit | 1 pint. |
| Coal tar naphtha | 1 pint. |
| Benzine | 1 pint. |

The rosin spirit or rosin essence is the lighter fractionate which may be obtained by the destructive distillation of rosin.

To obtain the best results in the compounding of this substitute oil, it is necessary that the ingredients be mixed in the following manner:

The rosin is placed in a kettle over a slow fire, and after melting is allowed to boil until all foam has disappeared from its surface. The kettle is then removed and allowed to cool for about five minutes.

The turpentine, petroleum ether, rosin spirit and coal tar naphtha are then mixed and ten per cent of this is then added and the mixture is stirred continuously until it has cooled to about 50 degrees Fahrenheit. The benzine is then added very slowly with continuous stirring, after which the remaining portion of the mixture of turpentine, petroleum ether, rosin spirit, and coal tar naphtha is added. The whole is then allowed to stand twenty-four hours and is then ready for use.

As stated heretofore this oil will have all the qualities of pure linseed oil when mixed with the other paint ingredients, and, unlike many of the substitutes already on the market, it will not run, peel, or crack, and is absolutely waterproof. Aside from this it may be used alone as a varnish for all kinds of cabinet work as well as a preservative for any material exposed to the weather. As a varnish this compound gives a bright lustre to wood.

Having thus fully described my composition of matter, what I desire protected by Letters Patent is:

I claim:

1. The herein described composition of matter, consisting of rosin, turpentine, petroleum ether, rosin spirit, coal tar naphtha, and benzine, in substantially the proportions specified.

2. A composition of matter, consisting of rosin, turpentine, petroleum ether, rosin spirit, coal tar naphtha, and benzine, so compounded as to be serviceable as a substitute for linseed oil in the preparation of paints.

3. That method of preparing a composition of matter which consists in the melting of rosin to a fluid state; allowing the same to cool for approximately five minutes; adding a small quantity of a solution of turpentine, petroleum ether, rosin spirit, and coal tar naphtha, while continuously stirring the rosin until the solution is admixed therewith; permitting the mixture to cool to approximately fifty degrees Fahrenheit; adding a quantity of benzine by pouring the same very slowly into the mixture while continuously stirring the same; and subsequently adding a relatively large quantity of a solution of turpentine, petroleum ether, rosin spirit, and coal tar naphtha.

4. That method of preparing a composition for paint which consists in the melting of approximately four pounds of rosin to a fluid state; permitting the melted rosin to cool for about five minutes; adding a ten per cent mixture of the following substances and their proportions in mixed condition:—

| | |
|---|---|
| Turpentine | 1 pint. |
| Petroleum ether | 1 pint. |
| Rosin spirit | 1 pint. |
| Coal tar naphtha | 1 pint. | continuously stirring the rosin while adding the ten per cent quantity of the said mixture; permitting the resultant substance to cool to about 50° Fahrenheit; adding one pint of benzine very slowly while continuously stirring the substance; and adding the remaining 90% of the above mentioned mixture.

SEM LERNER.